United States Patent [19]

Toriumi et al.

[11] 4,151,987
[45] May 1, 1979

[54] FEEDING APPARATUS FOR CARDS AND THE LIKE

[75] Inventors: Shiro Toriumi, Machida; Takao Saijo, Mitaka, both of Japan

[73] Assignee: Minolta Camera Kabushiki Kaisha, Osaka, Japan

[21] Appl. No.: 853,080

[22] Filed: Nov. 21, 1977

[30] Foreign Application Priority Data

Dec. 1, 1976 [JP] Japan .................. 51/145080

[51] Int. Cl.² .............................................. B65H 1/08
[52] U.S. Cl. .................... 271/129; 271/139; 271/141; 271/143; 271/160
[58] Field of Search ................... 271/128–131, 271/139, 140, 141, 143, 160

[56] References Cited

U.S. PATENT DOCUMENTS

| 3,524,640 | 8/1970 | Dvorak | 271/160 |
| 3,680,856 | 8/1972 | Haas | 271/143 |

FOREIGN PATENT DOCUMENTS

730953  6/1955  United Kingdom ................ 271/143

*Primary Examiner*—Richard A. Schacher
*Attorney, Agent, or Firm*—Wolder, Gross & Yavner

[57] ABSTRACT

A card dispensing mechanism for withdrawing individual cards from a stack thereof and feeding it to a use station including a stack support structure and a pressure plate urging the stack with the foremost card at a dispensing point. A carriage has a roller at a first end riding along a track longitudinally parallel to the foremost card front face and is engaged by a rocked lever at its opposite end and a pawl element is mounted proximate the carriage first end and projects toward engagement with the foremost card trailing edge to rotate and rock with the carriage. With the rocking of the lever on its advanced stroke the pawl element initially engages the card trailing edge to impart an advancing outwardly inclined force thereto and during the major advance of the card applies a longitudinal force thereto parallel to the card face and approaching the end of the stroke, the force is again outwardly inclined. Nip rollers are provided to engage and advance the card as it approaches the end of its pawl advanced travel to feed it to a projection station of a microfilm reader.

11 Claims, 11 Drawing Figures

FIG.9

FEEDING APPARATUS FOR CARDS AND THE LIKE

BACKGROUND OF THE INVENTION

The present invention generally relates to improvements in feeding apparatus for cards and the like, and more particularly it relates to an improved apparatus for feeding individual cards one by one from a plurality of cards stacked in superimposed fashion.

Conventionally, there have been proposed a variety of apparatuses for feeding cards one by one from a pluraity of cards arranged in side by side fashion or stacked in superimposed fashion. As a few examples of these apparatuses, a rotating roller engaging the topmost card of a plurality of cards stacked functions to feed the card by peripherally advancing the same, or a pawl engages a trailing edge of a card and advances and feeds the card. In the apparatus which uses a pawl to feed the card, the pawl is normally brought into engagement with one edge, i.e., with the trailing edge of the card perpendicular to the feeding direction of the card and then urges the card forwardly with the urging force from the pawl to the card being alpplied in a direction substantially parallel to the feeding direction of the card. In another apparatus which uses a pawl to feed cards one by one such as that shown in U.S. Pat. No. 3,145,023, the pawl engaging an edge of the card urges the card forwardly with the urging force of the pawl following a circular path. While these apparatuses feed cards with relatively high accuracy, a drawback is that in the long run the pawl frequency fails to engage an edge of the card so that no feeding action occurs, that the pawl slips from engagement with the edge of the card during its feeding so that feeding of the card is interrupted in the midst of feeding, or that the pawl tends to mar the card.

SUMMARY OF THE INVENTION

Accordingly, it is a primary object of the present invention to provide an improved feeding apparatus for cards and the like.

Another object of the present invention is to provide a novel and improved card feeding apparatus employing a pawl means to feed cards one by one in which the cards are fed with high reliability.

Still another object of the present invention is to provide a novel and improved card feeding apparatus in which a card fed by the feeding means is brought to a predetermined position with high accuracy.

It has been found that the aforesaid and other related objects of the present invention may be attained in a card feeding apparatus in which a novel pawl means for feeding the cards one by one is provided which urges the individual card in a particular manner to effect the smooth feeding of the cards.

For a fuller understanding of the nature and objects of the present invention reference is made to the following detailed description taken in conjunction with the accompanying drawings.

DESCRIPTION OF THE PREFERRED EMBODIMENTS

Figure 1:
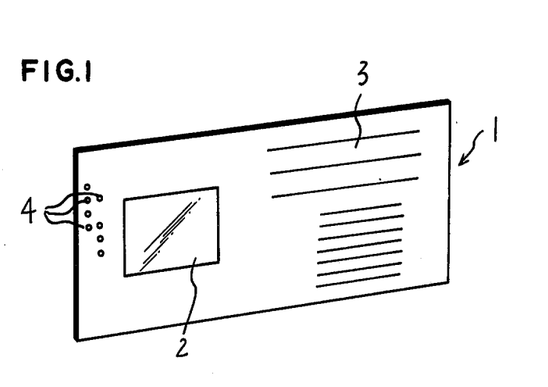
FIG. 1 is a perspective view of a card shown by way of example as handled by the improved feeding apparatus.

Referring now to the drawings which illustrate a preferred embodiment of the present invention and particularly to FIG. 1 which shows an example of a card 1 to be fed by the feeding apparatus herein described, the card shown being an apertured microfilm card of rectangular shape. The card 1 is formed with an opening in part thereof, in which a sheet of microfilm 2 containing specific information is set. The apertured card also has a space 3 for recording clerical information relevant to the film. The card may also be provided with perforations 4 for discrimination thereof so that automatic reference to a desired card may be accomplished by optical means or the like. Although the present invention is applicable to the feeding of any type of card or the like other than the aforesaid apertured microfilm card, the present invention will be described as embodied in an apertured microfilm card projection apparatus, for the convenience of explanation.

Figure 2:
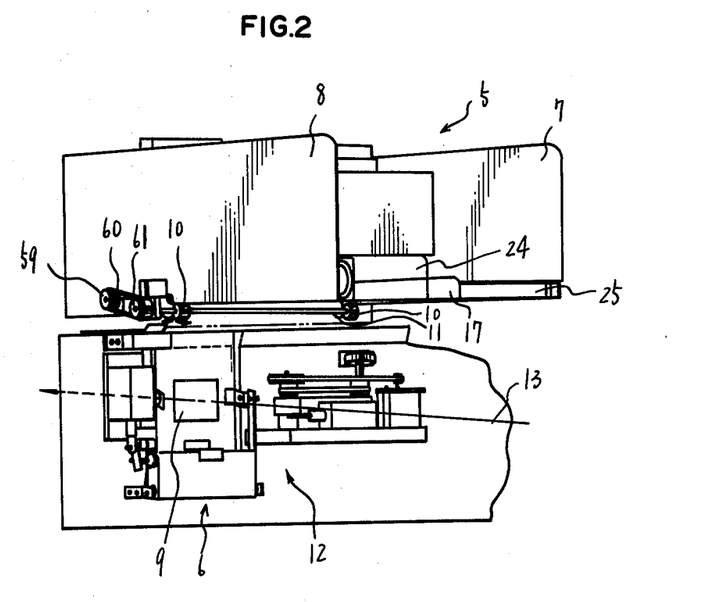
FIG. 2 is a perspective view of the essential part of a microfilm reader apparatus in which the feeding apparatus in accordance with the present invention is employed.

As seen in FIG. 2 which shows a projection reader apparatus for apertured microfilm cards, the reference numeral 5 generally designates the card feeding apparatus provided at the upper half of the projection reader apparatus with the card projecting means 6 for projecting an image of microfilm provided in the lower half thereof. A plurality of cards 1 are stacked in superimposed fashion and held between opposite parallel side plates 7 and 8 of the feeding apparatus 5. The cards are individually successively fed one by one to a projecting position 9 by way of cooperating feed rollers 10 and 11. When a card 1 is fed to the projection position 9 of the projecting means 5, the card 1 is accurately positioned by a card positioning and discharging means 12 so as to position the microfilm 2 on the card in registry with the projecting position 9. The card 1 is then exposed by a suitable light source (not shown) provided along the optical axis 13 and projected onto a screen (not shown) in enlarged form for viewing. A mechanism for projecting the enlarged image of the microfilm in the apertured card is similar in construction to known microfilm readers, and hence no description is given herein. The card, after the completion of projection, is discharged to a discharge position (not shown) provided rightwards as viewed in FIG. 2.

Figure 3:
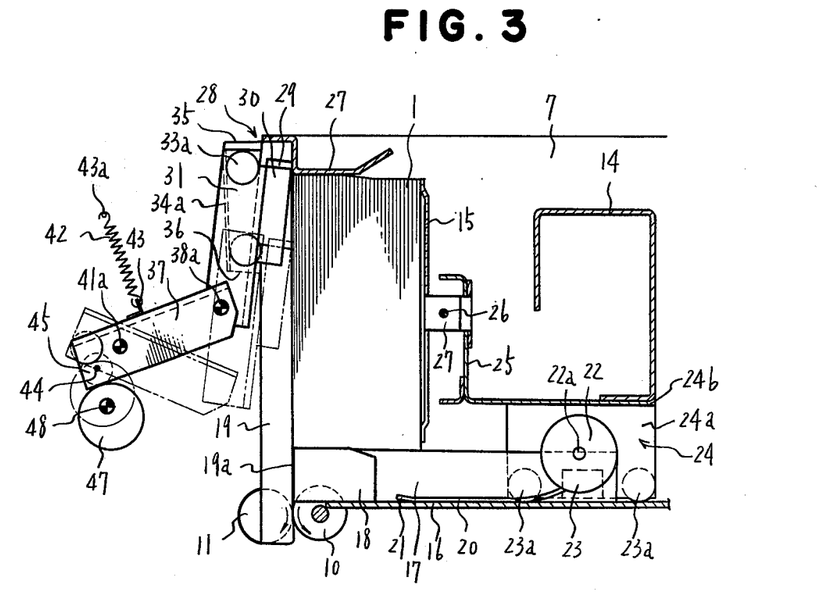
FIG. 3 is a cross-sectional view taken along the line III—III of FIG. 6, showing a preferred embodiment of the feeding apparatus in accordance with the present invention.

Referring now to FIG. 3 which shows a cross-sectional view of the card feeding apparatus according to the present invention, a plurality of cards are arranged upright in side by side relation in a storage spaced made accessible by pulling a handle 14 rightwards between opposing side plates 7 and 8 and are pressed by a card pressing plate 15. More specifically, on a base plate 16 of the apparatus, there is provided a pair of opposite base rails 17 transversely spaced from one another and extending parallel across the base plate 16. Also provided on the base plate 16 at one end and between the base rails 17 is a lower end limiting plate 18 of somewhat higher height than the base rails 17. Thus, the cards are placed in upright manner on the base rails 17 and on the lower limiting plate 18 with the side ends of the frontmost (leftmost) card 1 contacting cards firmly abutting plates 19. It is noted that the lower limiting plate 18 together with card abutting plates define a card feeding position for foremost card.

The cards stacked in superimposed fashion are pressed firmly against the card abutting plates 19 by the card pressing plate 15 through the spring force of a closely coiled spiral spring 20. The spiral spring 20 in a form of a striper sheet (as shown in FIG. 4) has its one or outer end 21 fixed to the base plate 16 between the base rails 17 and the other end wound about and fixed to a rotatable spool 22. Spool 22 is located between the base rails 17 and rotatably supported by a channel shaped or U-shaped supporting member 24. More specifically, the supporting member 24 has side face portions 24a of rectangular shapes formed vertically parallel to and shape formed integrally with the side face portions to form itself into a shape of channel. The spool is rotatably supported by a suitable shaft means 22a extending across the side face portions of the member 24. For allowing the spool 22 as well as the card pressing plate 15 and the handle 14 to move integrally in the pressing direction as the stacked cards are fed out or dispensed one by one, the supporting member 24 includes on its lower end portions of side face portions 24a a plural pairs of bearings 23a some of which are rotatable along the base plate 1b and the remainings of which are rotatable along a guide 25 formed at the lower ends of the side plates 7 and 8 so as to guide the bearings 23a correctly along the base plate 16. To the supporting member 24, the handle 14 having a sidewise length substantially equal to the distance between the side plate 7 and 8 is integrally attached and also fixed to the supporting member 24, is a connecting arm or lever 25 for the card pressing plate 15. To lever 25, the card pressing plate 15 is pivotally supported at its side end portions by shafts 26 extending through connecting members 27 and has top and bottom ends bent or slightly offset toward cards to form upper and lower abutments for the cards 1. In this way, the card pressing plate 15 can pivotally move both in the vertical and transverse directions with respect to cards by a combination of bearings 23a and shaft 26, so that pressure is uniformly applied over the entire surfaces of cards.

Figures 4A, 4B:
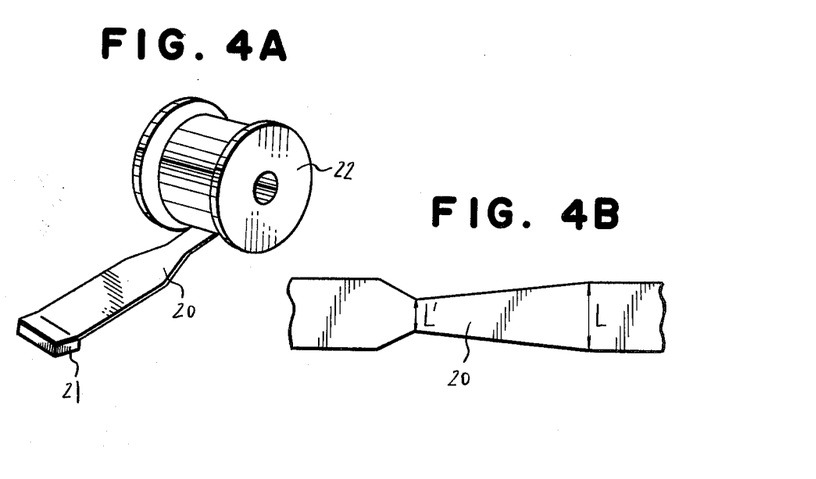
FIGS. 4A and 4B are perspective and fragmentary plan views respectively of a closely coiled, spiral spring incorporated in the feeding apparatus according to the present invention.

As explained, the card pressing plate 15 is urged against the cards by the force of a spring. However, this pressing force should preferably vary in accordance with the number of cards remaining between the pressing plate 15 and the card abutting plate 19. This is to say that whatever the type of spring used, it should be so designed as to provide a force of a magnitude commensurate with the number of cards in order to effect the smooth feeding of cards. In this regard, the determinations were made with respect to force to be applied and it was determined that a force of about 1 kg for 500 apertured cards and about 350g for less than 100 cards were preferable. For this purpose, the apparatus of the present invention uses the closely coiled spiral spring 20 described above for effecting the pressing of the card pressing plate 15 against the cards. To be more specific, the spiral spring 20, such as that shown in FIG. 4A is employed in the present invention and the spring 20 has a continuously varying width from L to L' so that the pressure by this spring may be reduced with a decrease in the number of cards in the stack, as shown in FIG. 4B. It should be noted that instead of forming the spring with a varying width, the thickness of the spring 20 may be gradually varied to perform the same function.

Referring back to FIG. 3, a plurality of cards 1 are placed on the base rails 17, then ride on the lower limiting plate 18, and are eventually advanced towards a feeding position with their top ends being confined by an upper limiting plate 27. The right and left side borders or end portions, of the frontmost card 1 is urged against card abutting plate 19 and fixedly held due to the friction of the card abutting plates 19 relative to the succeeding card. A gap 19a between the lower limiting plate 18 and each card-abutting plate 19, a combination of which forms a card passing gate, is advantageously within the range of from 1.1 to 1.6 times the thickness of a card. Between the aforesaid card abutting plates with which the left and right end portions of a card are in contact, there is disposed a card feeding pawl so designed to individually dispense or feed cards one by one.

Figure 6:
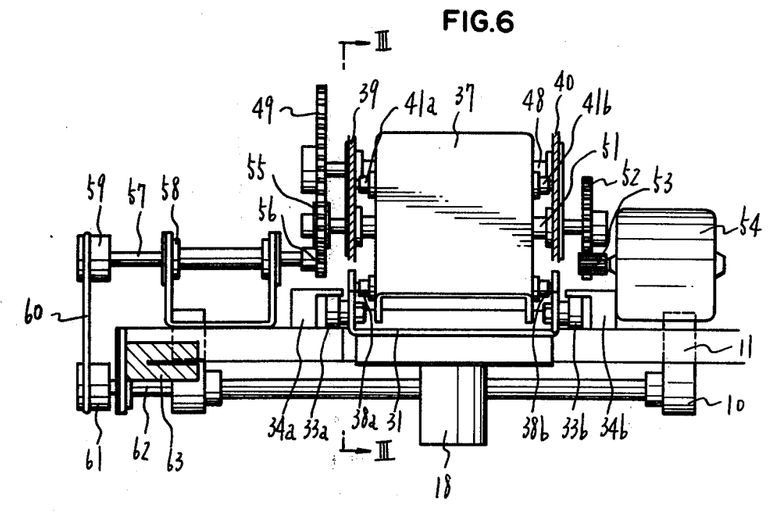
FIG. 6 is a top plan view of the feeding apparatus of FIG. 3.

The card feeding pawl generally indicated by the reference numeral 28 in FIG. 3 has a pawl member 29 projecting substantially at a right angle from one end of a pawl supporting plate 30 towards cards. The pawl member 29 formed on the pawl supporting plate 30 is so positioned to engage a mid portion of the top edge of the foremost card. The extent of the tip 29a of the pawl member 29 projects from the top edge of the supporting plate 30 may be in excess of a card thickness in the mechanism of the present invention because the tip 29a of the pawl member 29 is so adapted to tilt with respect to the top or trailing edge of a card for engagement with the card, and the extent of pawl tip projecting therefore may be determined according to the degree of inclination of the pawl member 29 relative to a top edge of the card. Connected integrally to the pawl supporting plate 30 which is formed with the pawl member 29 is a pawl moving member or a plate 31 which has slide bearings 33a and 33b at both sides of the upper ends thereof. The slide bearings 33a and 33b, as more clearly shown in FIG. 6, are positioned between the card abutting plates 19 and bearing limiting tracks or plates 34a and 34b so that their rotatable movements are confined to a vertical direction only as viewed in FIG. 3 and the extent of their vertical or upward movements are limited by suitable stops 35 and 36. The pawl moving plate 31 is of substantially flat U-shape and is coupled at its lower end portions to one end of feed lever 37 by means of pivot bearings 38a and 38b as shown in FIGS. 3 and 6. The feed lever 37 is also of substantially flat U-shape and is further coupled to fixed frames 39 and 40 by means of pivot bearings 41a and 41b.

Figure 7:
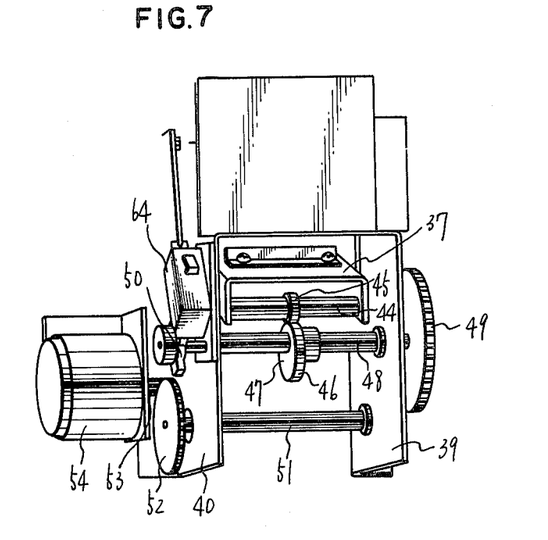
FIG. 7 is a perspective view of the feeding apparatus as viewed from the left side of FIG. 3.

The feed lever 37 as viewed in FIG. 3 has an end of a helical tension spring 42 fixed thereto by a bracket or locking member 43 with the other end of the spring 42 fixed to the frame of the apparatus at point 43a so that the feed lever is urged upwardly about the bearings 41a and 41b. The feed lever 37 also has a fixed shaft 44 extending across and fixed to extended or outer portions of the lever 37 at the ends opposite to the ends where the lever is coupled to the pawl moving plate 31. At the mid portion of the shaft 44, there is provided a cam contacting bearing or follower 45 engaging the cam surface 46 of an eccentric cam 47. More specifically, as shown in FIG. 7, the eccentric cam 47 is mounted at the mid portion of a cam shaft 48, which in turn is supported by the fixed frames 39 and 40 in a manner to project through these frames. To the projected ends of the cam shaft 48, there is provided a cam rotating gear 49 at one end and control cam 50 at the other end.

Another shaft 51, which is a drive shaft, is mounted across the fixed frames 39 and 40 and an end projecting beyond the frame 40 carries a drive gear 52 in engagement with a motor gear 53 driven by a drive motor 54. At the other end of the drive shaft 51 projecting beyond the fixed frame 39, there is provided a gear 55 (see FIG. 6) which engages the cam rotating gear 49 on the cam shaft 48. The cam rotating gear 49 of relatively large diameter also engages a roller rotating gear 56 and this gear is supported by a shaft 57 through suitable shaft bearings 58. The other end of shaft 57 carries a pulley 59 over which a belt 60 is entrained and and which is also entrained about a roller rotating pully 61. The pulley 61 is mounted on a shaft 62 of feed roller 10 and thus the rotation of roller rotating gears 56 causes the feed rollers 10 and 11 to rotate to advance or feed the cards. It should be noted that the feed rollers 10 and 11 are positioned just below the passage gate formed between the card abutting plates 19 and the lower limiting plate 18. Also, there is provided at the side ends of feed rollers 10, 11 a data reader means 63 for reading perforations 4 in the card by a known combination of a light source and a light receiving or response element.

About a control cam 50 mounted at one end of the cam shaft 48, there is provided a microswitch 64 which is actuated by the cam 50 for controlling the drive motor 54 each time a single card is fed (see FIG. 7).

Before describing the projecting means 6 for projecting an image of the microfilm on a card and the card positioning and card discharging means 12 to which the cards are fed one by one, the operation of card feeding apparatus described above will be hereinafter explained.

A plurality of cards are first placed on the base rails 17 and on the lower limiting plate 18 in the space provided by retracting or pulling the handle 14. With the cards stacked in superimposed fashion as shown in FIG. 3, an operation switch (not shown) is actuated to initiate the feeding of cards. The actuation first causes the drive motor 54 to be energized to rotate the motor gear 53, and by this, the drive gear 52 carried by one end of the drive shaft 51 is driven and the gear 55 carried at the other end of drive shaft 51 is likewise driven. Through the rotation of gear 55, the cam rotating gear 49 is driven to rotate the eccentric cam 47 mounted on the cam shaft 48. The rotation of gear 49 also causes the roller rotating gear 56 to rotate which in turn drives the feed roller 10 through the belt 60 entrained over the pulleys 59 and 61. The rotation of eccentric cam 47 causes the cam contacting bearing or follower 45 provided on the shaft 44 to follow in contact with the cam surface 46 of the eccentric cam 47, so that the feed lever 37 begins to rotate or rock in the clockwise direction about an axis pivotally supported by bearings 41a and 41b. With the movement of feed lever 37, the pawl moving plate 31 coupled at its lower end portions to the inner ends of feed lever 37 by means of pivot bearings 38a and 38b is moved downwardly. The movement of the pawl moving plate 31 as the feed lever 37 is rotated is effected by sliding bearings 33a and 33b confined in the vertical space between the card abutting plates 19 and bearing limiting plates or guide tracks 34a and 34b. The pawl supporting plate 30 having the pawl member 29 at its top edge thus moves integrally with the pawl moving plate 31 as the plate 31 is attached integrally thereto. Accordingly, the pawl member 29 moves and the tip 29a thereof engages with the top edge of the card 1 to urge the card downwardly.

More specifically, the movement of pawl member 29 together with the pawl supporting plate 30 to which the pawl moving plate 31 is integrally fixed, is effected by changing or converting the rotation of feed lever 37 into linearly reciprocating up and down vertical motion. The pawl moving plate 31, whose lower ends are coupled to the feed lever 37 pivotally by bearings 38a and 38b is so arranged that when the feed lever 37 reaches a top dead center, namely, when the pawl member 29 engages the top edge of a card to be fed, and when the lever 37 reaches bottom dead center, namely, when the card is just nipped by the feed rollers 10, 11, the lower ends of the pawl moving plate 31 are at positions remote from the foremost card or card abutting plates 19; and during the time which the feed lever 37 is pivotally rotated from the top dead center to the bottom dead center, the lower ends of the pawl moving plate 31 come close to the foremost card so that card is urged downward with vertical force. (It should be noted that although the feed lever 37 moves beyond the top and bottom dead centers, these terms are used to describe the moments when the pawl member 29 engages with the card and when it disengages from the card.)

Stating differently, the pivot bearings 38a and 38b coupling the feed lever 37 to the pawl moving plate 31 describes a locus equally spaced from the surface of foremost card at the top and bottom dead centers of the movement of feed lever 37 but close to the card while in movements between the top and bottom dead centers. Thus, at the times when the pawl member 29 engages the top edge of card and when the card is just nipped by feed rollers 10, 11 so that the pawl member 29 may be disengaged from the top edge of the card, the tip of pawl member positively engages the top edge in the manner shown in FIG. 5A and forces the card downwards while pressing the card toward the abutting plates 19. That is to say that the pawl member presses the top edge of the card at an inclined angle relative to the feeding direction of the card as shown by the arrow in FIG. 5A, thus preventing the misfeed of cards. Just after engagement of the pawl member 29 with the card until just before the card is nipped by feed rollers 10, 11, the card is urged downwards with pressure from the pawl member 29 acting vertically as shown by the arrow in FIG. 5B as the lower ends of pawl moving plate 31 would follow the path close to and substantially parallel to the feeding direction of the card, thus obviating any likelihood of damaging the top edge of the card.

Figure 5A:
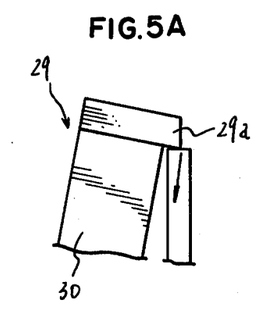
FIG. 5A is a side view showing the relationship of the card feeding pawl to a card at the initial stage of engagement of the pawl with the card and at the final stage of the pawl with the card as the latter is nipped by feeding rollers.
Figure 5B:
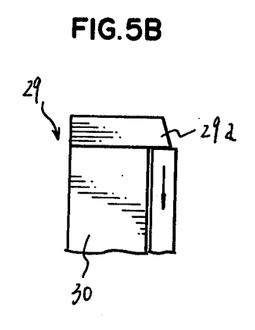
FIG. 5B is a view similar to FIG. 5A but showing the relationship of the card feeding pawl to the card in the process of feeding the card forwardly towards the feeding rollers.

The card fed or dispensed by the pawl member 29 is nipped between the feed rollers 10, 11 by the time the pawl member 29 together with the pawl supporting plate 30, the pawl moving plate 31 and the feed lever 37 reaches the positions shown by the two dotted lines. These elements are then returned to their initial positions under the influence of spring 42, simultaneously with the termination of one cycle of rotation of eccentric cam 47. Control cam 50 mounted coaxially with eccentric cam 47 actuates a microswitch upon termination of each cycle of rotation of eccentric cam 47, thereby deenergizing the drive motor 54. The pair of feed rollers 10 and 11 feed the card to the succeeding projecting means during the half cycle of the cam. Also, immediately before the card is nipped by feed rollers 10, 11, one side portion of the card passes through data reader means 63, so that the perforations 4 of the card are read out by the data reader 63 for identification of the card.

Figure 8:
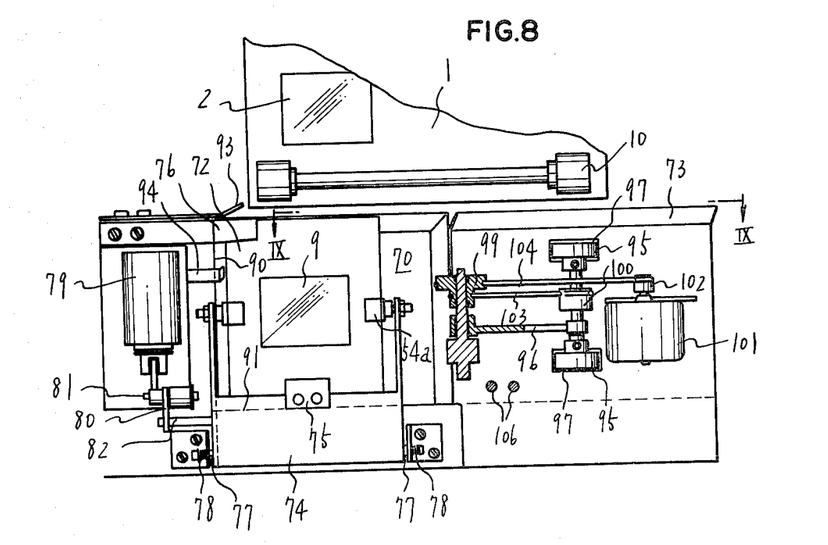
FIG. 8 is a front elevational view of the image projecting position following the card feeding apparatus, as viewed along the lines VIII—VIII of FIG. 9.
Figure 9:
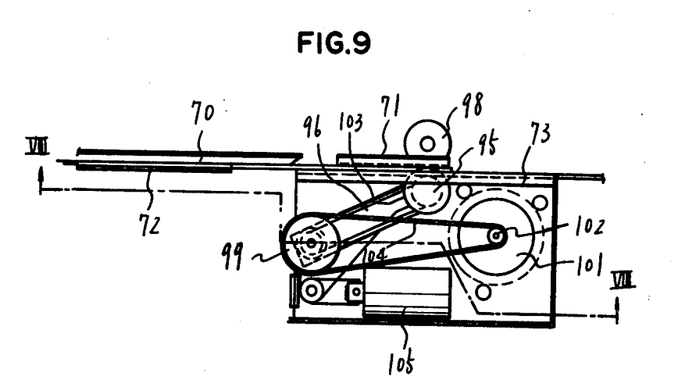
FIG. 9 is a plan view as viewed along the line IX—IX of FIG. 8.

Below the card feeding apparatus, the porjecting means 6 for projecting a microfilm image and a card positioning and discharging means 12 are provided, which will be hereunder described in conjunction with FIGS. 8 and 9. A card is fed by the aforedescribed feeding apparatus to a space formed between a flint glass plate 70 and a pressure glass plate 72 and between a first guide plate 71 and a second guide plate 73. Pressure glass plate 72 is rotatably supported at the mid points on the opposite side portions thereof by a pressure glass support lever 74. The displacement of the glass 72 is limited by limiting plates 75 and 76. Support lever 74 is supported at the lower end by shaft 77 rotatably thereabout, and normally loaded by springs 78 wound around shaft 77 in a direction away from the flint glass 70. The pressure contact of the glass plate 72 with a card is accomplished when a lever 80 rotates about a shaft 81 due to the energization of a solenoid 79 and presses a pin 82 extending from support lever 74. The lever 74 has a pair of bearings 54a for pressing the glass plate 72.

The locating of the card in the projection position is accomplished by contacting the left side edge of the card with a locating surface 90 and by contacting the lower edge of the card with a locating surface 91. In order to protect the card from any impact when fed to the projecting positions, leaf springs 93, 94 are provided.

A pair of rollers 95 are provided for positioning the card in the projecting position. The pair of rollers 95 are supported by a pivotal lever 96 swingably from openings 97 in second guide plate 73 between a position to abut a card and a position away from a card. First guide plate 71 opposed to second guide plate 73 is provided withh openings corresponding to openings 97, in which openings are provided driven rollers 98, respectively. An idle pulley 99 is mounted on the shaft of pivotal lever 96. Two belts 103 and 104 are provided in a manner that the belt 104 is trained about idle pulley 99 and motor pulley 102, and the belt 103 is trained about idle pulley 99 and a pulley 100 mounted on a shaft of rollers 95, thereby transmitting a drive force to driven rollers 98. Motor 101 is a reversible motor. A rod of a solenoid 105 is connected to a portion displaced from the center of rotation of pivotal level 96, so that energization of deenergization of solenoid 105 causes engagement or disengagement of driven rollers 98 with or from rollers 95. Light measuring elements 106 are provided on second guide plate 73 so as to sense the presence or absence of a card for preventing the misfeeding of a card.

The card fed downwardly to the projecting means assumes a position displaced from the image projecting position. That is, the card is displaced toward discharging end and thus the card must be moved toward left as viewed in FIG. 8 to bring the same to projecting position.

When the card is fed to the aforesaid displaced position, motor 101 will start running in the normal direction, and at the same time, solenoid 105 will be excited to move rollers 95 to the position in which they engage the card. The pair of rollers 95 are rotated by motor 101 in the normal direction (in the counterclockwise direction as viewed in FIG. 9), to thereby position the card in the prescribed projecting position, more specifically in the position defined by the locating surfaces 90, 91 in FIG. 8. When the locating of the card is terminated, solenoid 79 is energized to rotate pressure-glass support lever 74 by way of lever 80 and pin 82, whereby pressure-glass 72 is brought into pressure-contact with the card. Thus, the card is completely settled in the projecting position, and an image of the card is projected on the screen by means of a light source and lens system (not shown). Upon termination of the projection of the image, solenoid 79 is deenergized, so that the pressure-glass 72 is moved away from the card under the action of springs 77. Subsequently, solenoid 105 is again energized, so that rollers 95 will come to engagement with the card, and at the same time, a reverse rotation signal is fed to motor 101, thereby rotating rollers 95 in the reverse direction (in the clockwise direction as viewed in FIG. 9), whereby the card is transported to the discharge position which is provided rightwards in FIG. 9, although it is not shown in the drawing.

The provision of reversibly rotatable rollers 95 serving as a card locating means as well as the card discharging means affords the simplicity in construction of the device itself and reduction in space thereof.

In the embodiment illustrated, cards are shown as being set upright in side by side relation. It should be understood that the present invention be applied to the case where a plurality of cards are stacked in superimposed relation, horizontally.

The arrangements according to the present invention are advantageous in that, when the card feed pawl engages the top edge of a card and when the card is positioned between feed rollers, at which a resistance to the card feeding pawl is the largest, then the tip of the pawl portion of the card feeding pawl engages the top edge of the card and feeds the card downwards with a force in a direction of urging the card towards the card abutting plates, and while the card is being fed towards the feed rollers at which a large force is not needed, the card is urged by the undersurface portion of pawl of the card feeding pawl with a force substantially parallel to the direction of movement of the card, such that the misfeeding of a card due to an accidental disengagement of the card feed pawl from a card is eliminated, and thus there remains little or no possibility of breaking the top edge of a card.

We claim:

1. A feeding apparatus for cards and the like for feeding cards one by one from a plurality of cards stacked in superimposed fashion, the apparatus comprising a pawl member for engaging a trailing edge of a card to feed the card to a card advancing means provided downstream of a feed path for the card, and means for moving said pawl member in a manner that said pawl member engages said card trailing edge to urge the card forwardly with the force from the pawl member to the card trailing edge being at an inclined angle away from the card upon initial engagement with the card edge, and as the card is fed forwardly, the force from the pawl member to the card becomes substantially parallel to the direction of feed, and then said force becoming inclined at an angle, away from the card as the card is engaged by said card advancing means, said pawl member disengaging the card and said card advancing means further advancing the card forwardly.

2. A feeding apparatus for cards which feeds cards one by one from a plurality of cards stacked in superimposed fashion, the apparatus comprising:
 card pressing means for pressing a plurality of cards toward a card feeding position,
 card stop means to which the side ends of a foremost card abuts for positioning the foremost card at the card feeding position,
 roller means provided downstream of the card feeding position along the feed path of the card,
 pawl means having a tip for engaging an edge of the card at said card feeding position and for urging the card forwardly toward said roller means.
 pawl moving means supporting said pawl means for moving the tip of the pawl means to urge the card forwardly in a direction parallel to the card and to urge the edge in a tilted direction,
 lever means having opposite first and second means, said pawl moving means having a first end pivotally coupled to said lever means first end,
 said lever means second end being pivotally coupled to fixed means,
 means for pivotally moving said lever means about said second end between at least first and second positions with said first position being the position when said pawl means engages with the edge of a card and the second position being a position when the card is substantially nipped by said roller means,
 said pawl means engaging with the edge of a card with the tip thereof tilted outwardly with respect to the feed direction of the card when said lever means is at said first and second positions so that the first end of said pawl moving means is remote from the card surface but substantially equally spaced apart when said lever means is at said first and second positions, and
 said pawl means retaining engagement with the edge of the card with the tip thereof urging the card substantially parallel to the feeding direction while said lever means is in motion between the first and second positions whereby the first end of said pawl moving means follows a path close to the card surface.

3. A feeding apparatus as claimed in claim 2, wherein said pawl moving means has second end provided with a rotatable slidable member, said member being confined to a guiding parallel to the feeding direction of the card.

4. A feeding apparatus as claimed in claim 3, wherein said pivotally moving means for said lever means includes an eccentric cam having a cam surface and a cam follower provided on said lever means and contacting said cam surface.

5. A feeding apparatus as claimed in claim 2, wherein said card pressing means includes a spring means which provide a force of a magnitude responsive to the number of cards stacked.

6. A feeding apparatus as claimed in claim 5, wherein said spring means is a closely coiled spiral spring having a width varying from one end to another.

7. A mechanism for individually dispensing cards from a stack thereof along a predetermined path from a trailing to an advanced position comprising a pawl element for engaging the trailing edge of the foremost card in said stack and actuating means for reciprocating said pawl element along a path parallel to the face of said foremost card and varying the orientation of said pawl element during its card dispensing advance stroke to apply an outwardly forwardly inclined force to said card trailing edge during the initial engagement of said trailing edge by said pawl element to apply a force parallel to the face of said card during the further advance of said card by said pawl element and to apply an outwardly forwardly inclined force to said card trailing edge by said pawl element at the advanced portion of said advance stroke.

8. The card dispensing mechanism of claim 7 wherein said actuating means comprises a guide extending longitudinally parallel to the face of said foremost card, a carriage member having a first end slidably longitudinally engaging said guide and an opposite second end, a swingable lever having an end pivoted to said carriage second end and means for rocking said swingable lever, said pawl element being carried by said carriage proximate said first end thereof 9. The mechanism of claim 7 including means for supporting said stack of cards with the foremost card lying along said predetermined path, spiral spring means having a continuously varying with for resiliently urging said stack toward said predetermined path and stop means restricting the forward motion of said foremost card to a position in said predetermined path.

10. The mechanism of claim 9 including means delineating a card feed passage lying along said predetermined path.

11. The mechanism of claim 7 including a pair of card advancing nip rollers extending across said predetermined path in advance of the leading edge of said foremost card in said stack.

* * * * *